Patented June 13, 1950

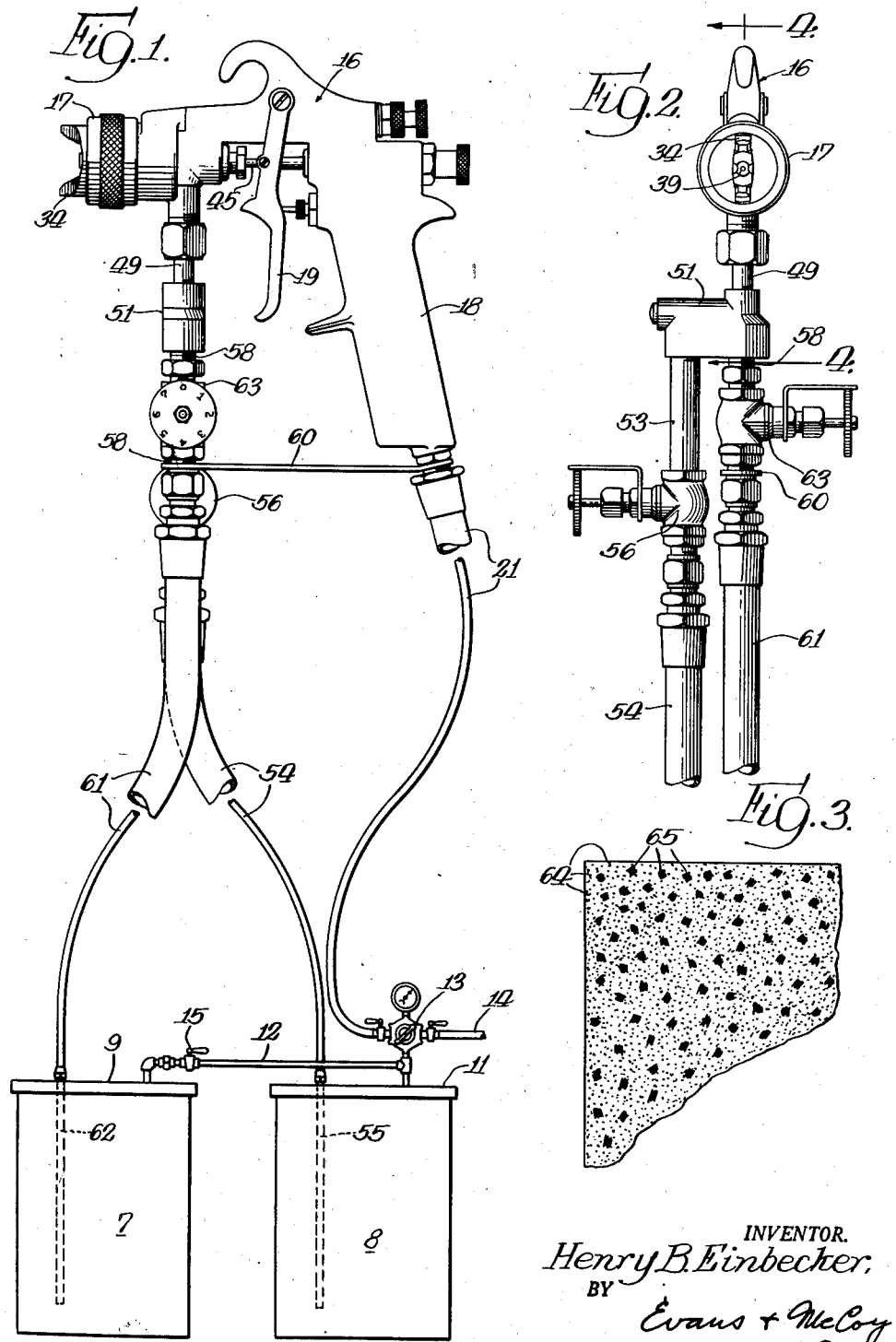

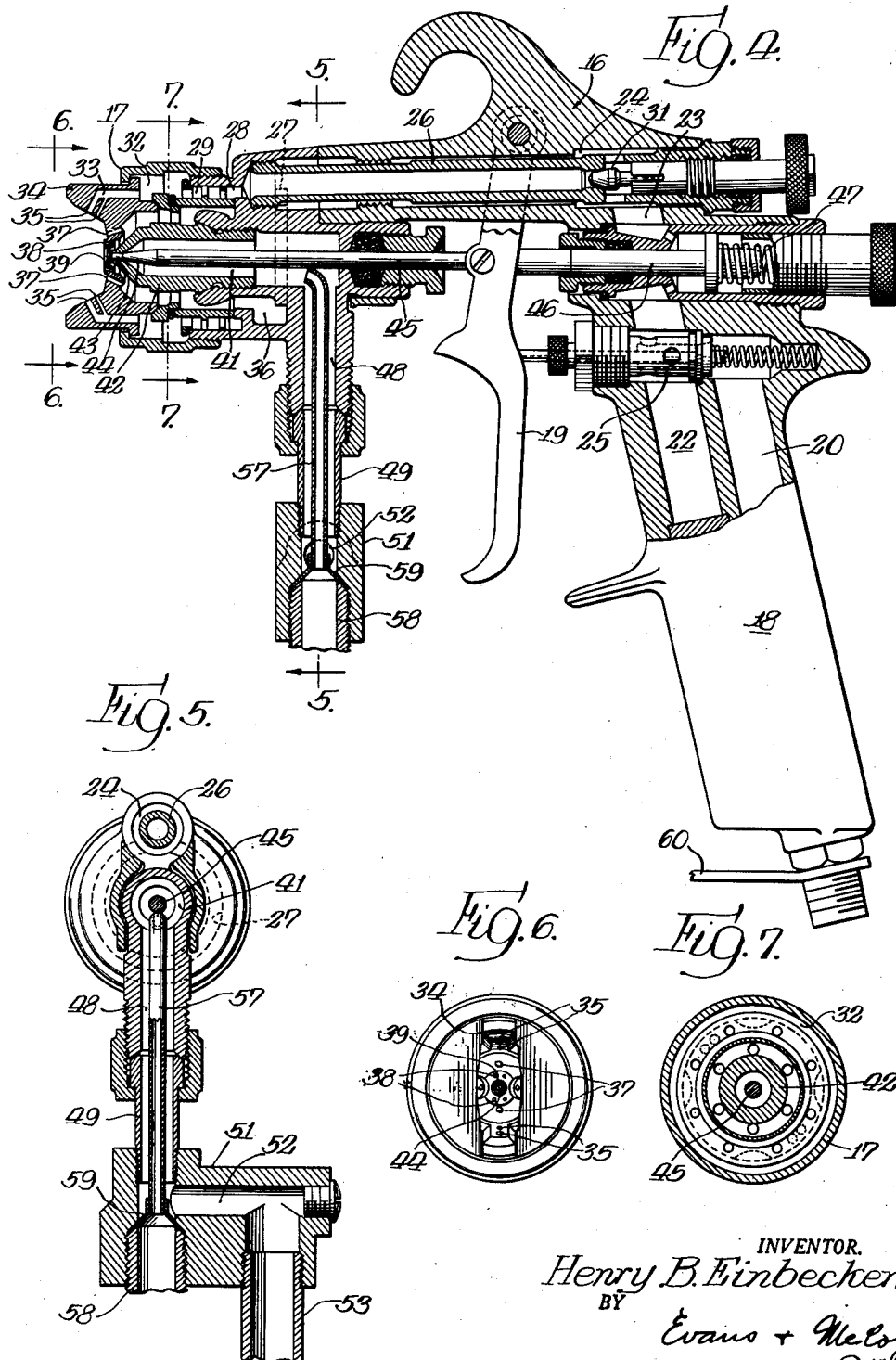

2,511,627

UNITED STATES PATENT OFFICE 2,511,627

METHOD FOR PRODUCING SPATTER FINISH COATINGS

Henry B. Einbecker, Homewood, Ill., assignor to The Sherwin-Williams Company, Cleveland, Ohio, a corporation of Ohio Application October 6, 1949, Serial No. 119,898

5 Claims. (Cl. 117—104)

This invention relates to surface coatings and a method for producing the same, and aims to produce an easily cleaned spatter finish coating of uniform pattern, attractive appearance and durable wearing qualities. Furthermore, the invention enables such an improved finish to be produced by one application instead of a plurality of applications, which have heretofore been required for the satisfactory production of a spatter finish.

Finishes of the type produced by this invention are particularly useful for many commercial products having external metal parts or surfaces. The normal processes of producing such metal parts, such as spinning, stamping, machining, and the like, frequently leave rough, blemished surface areas due to marks left by the cutting or forming tools, dies, and the like. To avoid polishing operations, such as are necessary when such metal surfaces are to be plated or provided with a solid colored or clear coating of paint, lacquer, varnish, or the like, it has been customary to mask such blemishes with either a wrinkle finish or a spatter finish. Wrinkle finishes were used more frequently heretofore because they could be applied in one coating operation, thereby effecting an enormous saving in labor and handling costs; the disadvantages of wrinkle finishes were that they were rough and extremely difficult to clean, thereby necessarily confining the color to black or other dark and drab colors which were less likely to show soil.

Spatter finishes, as produced heretofore, usually consist of a base or background coat of a solid color and one or more subsequent applications, by stippling or the like, of a color or colors contrasting with the background coat; it is the discontinuous areas covered by the subsequent application which provide an over-all pattern masking blemishes in the under surface. Spatter finishes possess the advantage of presenting a relatively smooth and, depending on the vehicle employed, almost glossy surface. Bright, sparkling colors may be employed in spatter finishes, since they do not possess the dust collecting and soil retaining surface texture of wrinkle finishes; furthermore, spatter finishes may be easily wiped or washed clean if soiled.

In addition to the aforementioned labor and handling costs which largely offset the advantages of prior art spatter finishes, another objection to spatter finishes as heretofore known was that it was extremely difficult to obtain a uniform over-all distribution of the discontinuous coating; if the second or discontinuous coating is applied by a stippling brush, it requires extreme skill to obtain a uniform distribution; almost equal skill is required to obtain a uniform over-all distribution when the second coating is applied with a spray gun; when multiple nozzle spray guns or a plurality of spray guns are employed in an effort to apply the continuous and discontinuous coatings simultaneously, the greater volume of coating delivered by the nozzles discharging the continuous coating tends to cover the discontinuous coating, producing a laminar or striated finish rather than a spatter finish. A still further objection to prior art spatter finishes is that the spatters of the discontinuous coat tend to wear off, leaving an unattractive unpatterned color in the worn areas and thus tending to emphasize the worn areas.

It is the object of this invention to provide a spatter finish which retains the above enumerated advantages while overcoming the disadvantages of prior art spatter finishes and, at the same time, providing the advantage of wrinkle finishes; namely, the application of a suitable masking coating in one operation.

In general, the object of this invention, which is to provide, in a single application, a finish having a uniformly distributed spotted or mottled appearance, is obtained by spraying the coating from a spray gun having a single orifice. The relatively continuous areas are coated with one paint or like coating composition and the relatively discontinuous areas are coated with a different paint. The uniformly distributed spatter effect is obtained by introducing the two different coating compositions into a single spray gun and then discharging the two coating compositions from the spray gun before they have been completely mixed or blended. The action of the spray gun in breaking up the discharged incompletely mixed coating compositions into separate droplets, it has been discovered, effectively arrests any substantial amount of mixing or blending when the partly mixed coating compositions, so broken up, are deposited on the surface to be coated, thereby producing a spatter finish in a single application.

From the foregoing, it should be apparent that a uniform over-all distribution of the discontinuous coating is obtained, not by the skill of the operator in applying the coating but by a heretofore unutilized function of the spray gun in breaking the discharge stream of liquid into droplets, which, if not all uniform in size, vary in size in a constant proportion throughout the cone or fan of spray delivered by the gun. The size of the splotches of the discontinuous coating and the sparseness or concentration of such splotches are likewise controlled independently of the skill of the operator, as will appear more fully in the following description of specific embodiments of my invention.

Spatter finishes produced by my invention resist wear without losing the desired patterned effect because the discontinuous coating is not merely applied over a continuous undercoating, but rather, tends to extend from the external surface into, if not completely through, the thickness of the finish. Wear on the coating, which may remove some dots or splotches which do not extend through the finish, will also uncover other dots or splotches of the discontinuous coating. Since the spray distributes the discontinuous coating uniformly throughout the finish, the specific pattern of the spatter finish may change with wear but the over-all desired patterned effect will be maintained.

In the following description of specific embodiments of my invention and in the claims, it is to be understood that the terms "continuous" and "discontinuous" are used relatively. The term "continuous" designates the coating material which appears to cover connected areas and which generally, but not always, covers more surface than any other one coating material included in the finish. The term "discontinuous" designates the remaining coating material or materials, since such remaining matterial or materials usually appear as disconnected dots or splotches. Where more than two coating compositions are employed, or in a few instances where only two are employed, one may obtain a spatter finish in which no one coating composition clearly covers connected areas; in such instances, the terms "continuous" and "discontinuous" are employed for reference purposes, the term "continuous" designating the coating which more nearly appears to serve as a background in the finish.

In order that my invention may be more fully explained by an illustrative description of one embodiment of apparatus employed for carrying out my invention, reference is made to the accompanying drawings in which:

Fig. 1 is an elevation of an apparatus constructed in accordance with the principles of my invention;

Fig. 2 is a fragmentary view looking toward the right at Fig. 1;

Fig. 3 is a fragmentary face view roughly exemplifying a surface coated in accordance with my invention;

Fig. 4 is a view similar to Fig. 1 but on an enlarged scale and is shown partly in vertical section as indicated by the line 4—4 in Fig. 2;

Fig. 5 is a vertical sectional view taken as indicated by the line 5—5 in Fig. 4;

Fig. 6 is an end view taken as indicated by the line 6—6 in Fig. 4; and

Fig. 7 is another vertical sectional view taken as indicated by the line 7—7 in Fig. 4.

In the drawing, the liquid coating compositions employed, two different paints in this instance, are contained in the receptacles 7 and 8 provided with the hermetically sealable covers 9 and 11. Air pressure is supplied to the receptacles through the branch line 12, reducing valve 13 and line 14 connected to a compressor or other suitable source not shown. It will be observed that, since the supply branch 12 is connected with both receptacles, these receptacles will be under a common pressure. A shut-off valve 15 is provided to render receptacle 7 inoperative by cutting off its air supply, in the event that it should become desirable to use the apparatus in some particular instance for the application of a single color only.

The colors are applied with a tool resembling in outside appearance an ordinary spray gun, but differing from the ordinary gun in that it comprises a liquid receiving chamber having a plurality of connections thereto through which the liquids from the plurality of containers are simultaneously delivered into the chamber. Except for those structural features incident to the simultaneous handling of a plurality of liquids, the structural details of the gun may be of standard or any preferred form. It will accordingly be unnecessary to describe in detailed particularity the well known features of the gun here shown for illustrative purposes.

Generally speaking, such a gun comprises a handle by which it may be held and manipulated, a nozzle from which liquid and compressed air are discharged, and suitable passages and valves by which the discharge of air and liquid are controlled.

Referring to Figs. 1 and 4 illustrating a gun of this general character, the body of the gun is indicated by 16, the nozzle generally by 17, the handle by 18, and the valve controlling lever or trigger by 19. The handle includes a passage 20 which is connected by a flexible conduit 21 to the air supply pipe 14 through the valve 13. This valve is so constructed that the pressure delivered to conduit 21 may be greater than that delivered to the branch 12 supplying the receptacles 7 and 8, or, if preferred, two pressure reducing valves may be employed. In either event, the pressure delivered through conduit 21 will generally, but not necessarily, be somewhat greater than that delivered to the liquid receptacles. I have found that excellent results are obtainable by employing an air pressure of approximately thirty pounds in the liquid receptacles, and a pressure of about forty pounds in the conduit 21, although my invention is in no wise limited to the utilization of these particular pressures. The passage 20 communicates with a second passage 22 which communicates through a port 23 with the rear portion of the bore 24. A main, normally closed, shut-off valve 25 is provided in the passage 22, and is adapted to be opened by operation of the trigger 19 in a well known manner.

The bore 24 opens at the rear end of the body 16 to receive a tube 26 which is threaded at its forward end in a restricted portion of the bore 24 in advance of a port 27, and the forward end of the tube communicates with the orifice 28 through which air is supplied to the chamber 29. The flow of air through the tube 26 will be regulated by a valve 31, and this air is delivered from the chamber 29 through the annular chamber 32 into the passage 33 in the head 34 of the nozzle, from whence it is discharged from the nozzle openings 35 diagonally toward the longitudinal axis of the gun. The air from the bore 24 surrounding the tube 26 passes through the annular port 27 into the chamber 36, from which it is discharged at the nozzle through the ports 37, 38 and 39.

A receiving chamber 41, formed by a bore in the housing 16 and a tubular extension 42 threaded into the bore, is provided with a discharge orifice 43 positioned coaxially with the nozzle head 34. The discharge orifice is controlled by a valve 44 carried by a stem 45 which is connected with the trigger 19. A plunger 46 and an expansion spring 47 normally urge the valve 44 into position to close the orifice 43 and hold the trigger in the position shown in Fig. 4.

The receiving chamber 41 is connected to receive liquids simultaneously from the containers 7 and 8. A passage 48 communicating with the rear end of the chamber is connected by a coupling 49 with the interior of a head 51 having a laterally extending passage 52 which is connected, through a pipe 53, with a flexible conduit 54. Conduit 54 in turn is connected to the upper end of a pipe 55 extending downwardly into the container 8. A regulating valve 56 interposed in the pipe 53 affords provision for regulating the flow of liquid from the container 8 into the receiving chamber 41.

Within the passage 48 is disposed a tube 57 opening at its upper end into the chamber 41 and at its lower end into a pipe 58 threaded into the head 51. A frustro-conical partition 59 into which the lower end of tube 57 is threaded affords support for the tube and separates the interior of pipe 58 from the head passage 52. A continuation of pipe 58 is connected to a flexible conduit 61, which in turn is connected with the upper end of pipe 62 extending downwardly into container 7. A regulating valve 63 interposed in pipe 58 affords provision for regulating the flow of liquid from container 7 into receiving chamber 41. Rigidity is added to the structure by a brace bar 60 cross-connecting the lower end of the handle 18 with the pipe 58.

My improved method is practiced in the following manner with the apparatus disclosed above. Assuming that the containers 7 and 8 are filled or partially filled with two different paints to be sprayed simultaneously from the gun, pressure is applied to the paints in the containers and to the spray gun as above described. The operator grasps the gun, directs the nozzle toward the surface to be coated, positions it the requisite distance from such surface, and pulls the trigger 19 to the right viewing Figs. 1 and 4. This action opens the air valve 25, permitting a flow of air under pressure to the nozzle and its discharge therefrom in converging jets through the orifices 35, 37, 38, and 39. Simultaneously the valve 44 is opened, permitting the discharge through the orifice 43 of a composite stream of the contrastingly colored liquids which have been separately delivered to the chamber 41 from the containers 7 and 8 through the tube 57 and passage 48, respectively.

Figure 3 of the drawings is an approximate indication of a type of spatter finish which may be produced by my method. Assuming that the two different paints employed differ in color, i. e., specifically, are black and white, the example in Fig. 3 shows the white paint as a continuous background tinted in this instance by the small dots 64 which may be extremely small droplets of the black paint or droplets of gray paint produced by the partial blending of the paints as they passed through the chamber 41 to the nozzle orifice 39. As shown by the large dots 65, however, a sufficient amount of the black paint remained unmixed as it passed through the gun to produce the stippled or spatter effect shown.

The sparseness or concentration of the dots 65 is controlled primarily by operation of the valves 56 and 63, which control the proportionate amounts of the two paints delivered to the gun, although the relative viscosity and normality also effect the contrast between the continuous and discontinuous areas, as explained below. Thus, a relatively large proportion of the paint desired for the continuous or apparent background will produce a sparsely spattered effect, while a lesser proportion will produce a more densely spattered effect.

Disregarding the effect of the possible variables of differing viscosity and normality of the two different paints and the fixed effect of the nozzle design which limits the fineness or coarseness of the droplets formed, the size of the dots 65 is controlled by the pressure of the atomizing air and the total volume of paint delivered to the spray gun. Thus, if the valves 56 and 63 are set to allow a relatively small amount of paint to be delivered to the gun, the partly mixed paint will be finely atomized and the dots 65 will be small. On the other hand, if the pressure is relatively low, the partly mixed paints will be poorly atomized and the dots 65 will be large.

It should be apparent that, in addition to the character of the paint vehicles, the extent of the partial blending of the paints in a given spray gun will be controlled by the length of time that the paints are commingled, that is, by the speed at which the paints travel through the common chamber 41. This factor is regulated by adjusting the air pressure and the volume of paint delivered.

To obtain a spatter finish, or a finish best described as a spatter finish, the coating compositions employed need not differ as to color but may differ only as to viscosity or as to normality (i. e., "oiliness"). Thus, two coating compositions of exactly the same color but differing as to viscosity and/or normality will, when applied by my method, produce a mottled sort of finish varying from a faintly hammered appearance to a satiny effect, depending upon the atomization of the component coating compositions, the degree of difference between the liquids and the extent of blending in the spray gun, differences in normality, of course, having the most pronounced tendency to minimize blending. This effect of differences in normality and/or viscosity is obtained even if both the coating compositions are colorless. For example, a finely atomized finish of two perfectly clear lacquers, differing both as to normality and viscosity, will produce an excellent satin finish when applied on a colored undersurface and frosted effect when applied to a colorless undersurface, such as glass, due apparently to differences in the indices of refraction of the two colorless components.

Considering the effects of differences in colors, extent of blendings, atomization, viscosity and normality, those skilled in the art will be readily and easily able to produce by means of this invention, a vast array of finishes best described as spatter finishes but varying from bold mottled or marbled effects employing more than two colors to subtle, satiny, clear or one-color finishes. The invention, therefore, is not limited to the specific embodiments disclosed but only by the appended claims.

The term "coating composition" as used in the appended claims is intended to include not only paints but also like coating compositions having an organic film-forming vehicle, such as lacquers, lacquer-enamels, varnishes and the like, which may be either air-dried or baked to form a dry solid film and which are equivalents for the purposes of the invention. The term is not intended to include mere solvents or like liquids containing no film-forming constituents. The terms "immiscible" or "different-miscibility characteristics" as used in the appended claims are terms designating liquid coating compositions which differ as to viscosity characteristics and/or normality.

It is also to be understood that the method of this invention may be practiced not only with hand spray guns, such as the one disclosed herein, but also with the so-called "automatic" guns used in automatic coating machinery. Further, while air is the most common and generally preferred medium for breaking up the stream of commingled paints into droplets, one may, if desired, employ other gaseous fluids for atomizing the coating compositions.

This application is a continuation-in-part of my now abandoned application for "Spatter finish coating and method and apparatus for producing the same" Serial No. 439,361, filed April 17, 1942, and of my copending applications Serial No. 691,922, filed August 21, 1946, and now abandoned for "Spatter finish coating and method of producing the same" and Serial No. 700,702, filed October 2, 1946, for "Apparatus for producing spatter finish coatings," the latter being a division of my first mentioned abandoned application.

I claim:

1. The method of producing a substantially reproducible spatter finish coating which comprises separately introducing in substantially the same direction into a common receiving chamber a plurality of substantially parallel flowing streams respectively composed of coating composition liquids capable of being dried to a solid state and differing substantially in their miscibility characteristics and in their light reflecting characteristics when dry, propelling said liquids into said chamber under superatmospheric pressure and in substantially uniform predetermined proportions and out of said chamber through a common orifice as a composite stream at a rate sufficient to prevent blending of said liquids into a homogeneous mixture in said chamber, breaking said composite stream into a spray of minute droplets before said liquids have blended into a homogeneous mixture, directing said droplets against a surface to be coated to deposit thereon a substantially continuous coating film of one such coating composition liquid with visually contrasting droplets of another such liquid randomly distributed therethrough in a substantially uniform overall concentration, and drying said film to a solid state, the difference in miscibility characteristics of said liquids being selected so that any blending thereof after being commingled in said chamber does not destroy the visual contrast between said substantially continuous film and said discrete droplets in the final dry coating.

2. The process of claim 1 in which said plurality of liquids differ in their miscibility characteristics by reason of differences in viscosity and differ in their light reflecting characteristics by reason of being differently pigmented.

3. The process of claim 1 in which said plurality of liquids differ in their miscibility characteristics by reason of differences in normality and differ in their light reflecting characteristics by reason of being differently pigmented.

4. The process of claim 1 in which said plurality of liquids differ in their miscibility characteristics by reason of differences in viscosity and normality and differ in their light reflecting characteristics by reason of being differently pigmented.

5. The process of claim 1 in which said plurality of substantially parallel flowing streams are separately introduced into said common receiving chamber at substantially the same point.

HENRY B. EINBECKER.

No references cited.